Jan. 27, 1970  J. N. LANE  3,492,638

SIGNAL SYSTEM FOR AUTOMOTIVE VEHICLES

Filed April 20, 1966

INVENTOR
JAMES N. LANE

BY *Irvin A. Lavine*

ATTORNEY

United States Patent Office 3,492,638
Patented Jan. 27, 1970

3,492,638
SIGNAL SYSTEM FOR AUTOMOTIVE VEHICLES
James N. Lane, 6116 Wheatland Road,
Baltimore, Md. 21228
Filed Apr. 20, 1966, Ser. No. 544,032
Int. Cl. B60q 1/00, 1/44; G08b 5/06
U.S. Cl. 340—66                        8 Claims

ABSTRACT OF THE DISCLOSURE

A vehicle with indicating lights which are cumulatively energized in proportion to the output of a speed changing means, i.e., the power source or brake system.

---

Automotive vehicles are equipped with rear indicator lights which are energized when the brake pedal is depressed. They thereby give a signal to a following vehicle either that no brake application is being made, or that a brake application is being made, but do not apprise the following vehicle of either the degree of brake application or of acceleration of the vehicle.

It has been proposed to equip an automotive vehicle with signal systems which indicate either engine idling or engine accelerating, the indication being by a change in the energization of one signal light to another. More particularly, one signal light is energized when the engine is idling, and when the automobile is accelerated, the idling indicator light is de-energized and another signal light is energized, to thereby indicate the acceleration.

It has similarly been proposed to provide a signal system in which a first signal light is energized upon an initial brake application and then upon a more forceful brake application, the first signal light is de-energized and another signal light is energized.

The above discussed systems are dependent either upon the driver of a following vehicle recognizing which one of several possible signal lights is energized, which may be difficult to achieve, or to remember, or such systems depend upon lettering on a lens covering the signal light, which lettering would be difficult or impossible to read at a distance. In both instances, the systems are deficient in that the signals given are not readily readable or are not readily understood.

In addition to the above, known and proposed signal systems of this general type have included signal lights placed either at or near the bumper level of an automobile, thus making them difficult to perceive, especially in heavy traffic where a following vehicle may be quite close. It is recognized that usually a following driver sees primarily what is at his eye level, so that those signals which are at or near the bumper are not as effective as they might be, and as a consequence accidents and near accidents occur because of the signal lights not being visible or not being in the primary optional path of the driver of the following vehicle.

An object of the present invention is to provide an improved and safer signal system for automotive vehicles.

Another object of the present invention is the provision of a signal system for automotive vehicles which is readily understood.

Yet another object of the present invention is to provide a signal system for automobiles which is substantially automatic in imparting an understanding of the information being signaled.

Still another object of the present invention is the provision of a signal system providing a readily understood indication of the degree of change in the speed of the vehicle.

A further object of the present invention is to provide a signal system having a cumulative indication of the change in speed of the vehicle.

A still further object of the present invention is the provision of a signal system placed in a readily viewed position on an automotive vehicle.

Other objects and many of the attendant advantages of the present invention will be more fully understood from the following specification and drawing, wherein.

Figure 1:
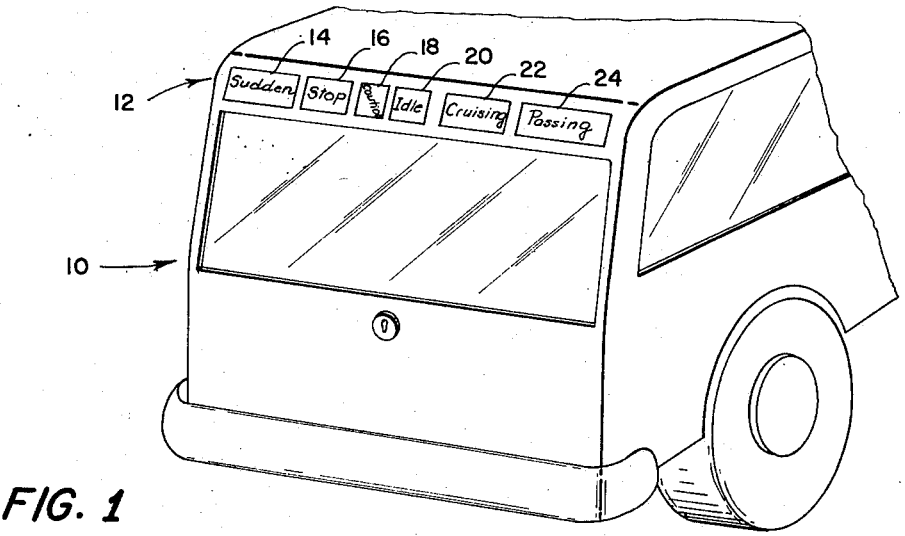
FIG. 1 is a view of an automotive vehicle (with parts broken away) equipped with the signal system of the present invention.
Figure 2:
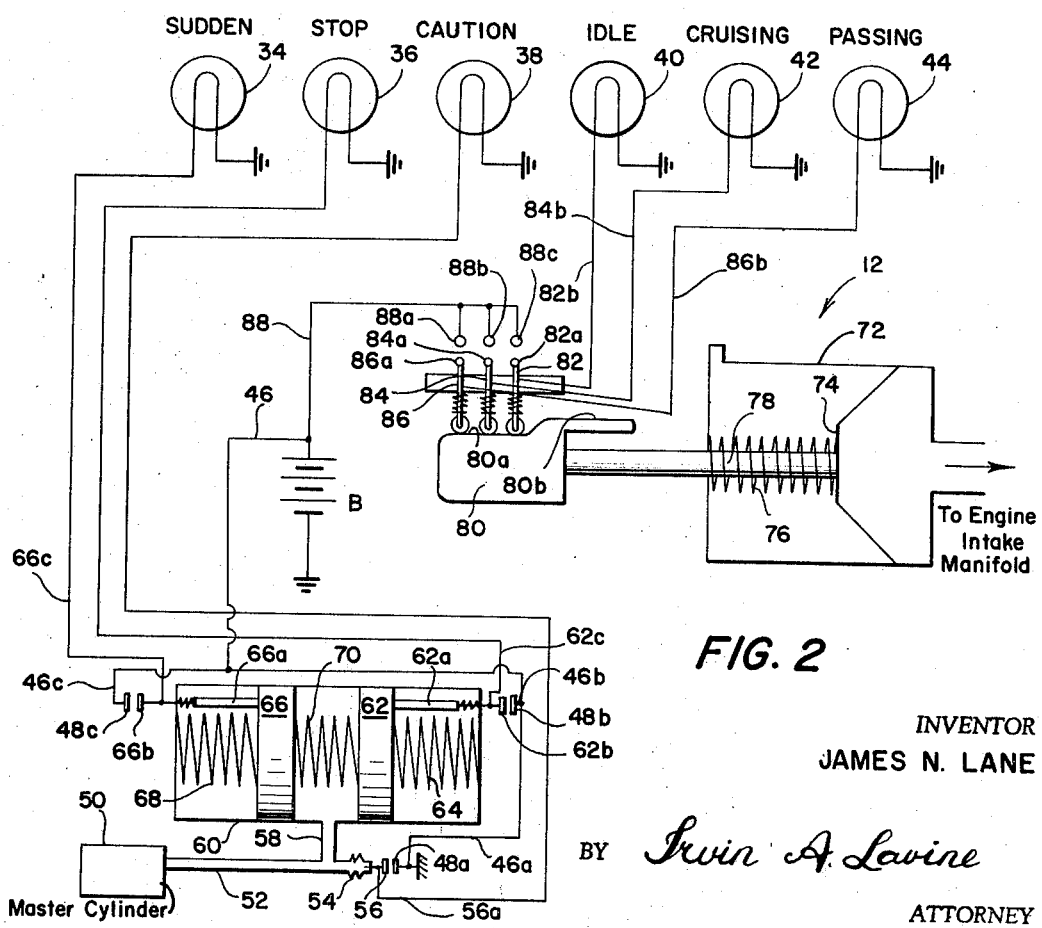
FIG. 2 is a diagramatic view illustrating the signal system of the present invention.

Referring now to the drawing, wherein like or corresponding reference numerals are used to designate like or corresponding parts throughout the several views, there is shown in FIG. 1 an automotive vehicle 10 equipped with a signal system 12. The vehicle 10 as here shown is a station wagon, the rear of the station wagon being illustrated and the signal system 12 being shown in position adjacent the roof line of vehicle 10, and extending substantially entirely across the rear of vehicle 10. The signal system 12 need not be placed at the roof line although this position is preferred, but may instead be placed at or above the belt line, which may be taken as the line separating the metal body of the automotive vehicle from the lower edge of the windows. The signal system 12 as shown in FIG. 1 includes a relatively large red lens 14 at the left-hand side of the vehicle, then a smaller red lens 16 and a still smaller red lens 18. Adjacent the smallest red lens 18 is a small green lens 20, a larger green lens 22 and the largest green lens 24, which is at the right-hand side of the vehicle. Behind each of the lenses 14–24 there is a signal light, the several signal lights being shown in FIG. 2 and designated 34, 36, 38, 40, 42, and 44, respectively. The system for energizing the signal light includes the vehicle battery B, or other source of electric energy having a conductor 46 with branches 46a, 46b and 46c, each terminating in a fixed contact 48a, 48b and 48c, respectively. A portion of a hydraulic brake system is illustrated on the drawing, although this is exemplary of different types of brake systems with which the present invention may be used. The brake system includes the master cylinder 50 having a fluid line 52 with a bellows 54 which carries a contact 56 that is engageable with the contact 48a. A conductor 56a extends from contact 56 to the signal light 38, the other side of which is connected to ground. A branch line 58 of the brake fluid system extends to a cylinder 60 in which are movably positioned a first piston 62 which may be moved to the right against a relatively weak spring 64, piston 62 carrying an extension 62a having a contact 62b on the end thereof in juxtaposition with contact 48b. A conductor 62c extends from contact 62b to the signal light 36, which is connected with ground. A second piston 66 is urged to the right by a relatively strong spring 68, and is similarly provided with an extension 66a carrying a contact 66b; a conductor 66c connects the contact 66b, which is in juxtaposition with contact 46c, with signal light 34, the latter being grounded. A spring 70 is provided to urge pistons 62 and 66 away from each other.

Also provided on the vehicle 10, and forming a part of the system 12 is a cylinder 72 having a piston 74 therein. Piston 74 may be connected by a bellows to cylinder 72, and the right-hand end of cylinder 72 is connected with the automobile engine intake manifold in such manner that when the engine is idling piston 74 moves slightly to the left, when the engine is operating at a constant driving speed, piston 74 is moved somewhat more to the left, and when the engine is accelerating, as when the accelerator pedal is substantially depressed, the piston 74 moves to an extreme left position. The left-hand end of cylinder 72 is vented. Movement of piston 74 occurs against a spring 76, which encircles a piston rod 78 carrying a cam 80 having a lower cam surface 80a and an upper cam surface 80b. A cam follower 82 has a contact 82a, to which is connected a conductor 82b which extends to signal light 40, which is grounded. Cam follower 84 has a contact 84a and a conductor 84b extends to the grounded signal light 42. Cam follower 86 similarly has a contact 86a and is connected with signal light 44 by conductor 86b. A branch 88 of conductor 46 from battery B is connected with the contacts 88a, 88b and 88c, which latter are in juxtaposition with contacts 86a, 84a and 82a, respectively.

Under idling conditions, piston 74 will have moved cam 80 slightly to the left, sufficiently to cause follower 82 to rise, thereby energizing signal light 40, which is behind the green lens 20, thereby indicating the condition of the engine. When the accelerator is depressed, piston 74 will move to the left, thereby moving follower 84 and energizing, in addition, signal light 42. Thus, the signal lights behind the lenses 20 and 22 will be energized during cruising of the vehicle, at substantially constant speed. When the speed of the vehicle is significantly changed, as when the accelerator is substantially depressed to thereby increase the engine output, piston 74 will move to the left still further, actuating follower 86. In this condition, the signal light 44, in addition, will be energized, and it will therefore be seen that all three of the green lenses 20, 22, and 24 will be energized, thereby providing an obvious and readily apparent indication that the vehicle is being accelerated. After acceleration has ended, and the vehicle is at a cruising speed, piston 74 will move slightly to the right, thereby breaking the circuit to signal light 44, signal lights 40 and 42 remaining in completed circuits.

Upon initial engagement of the foot of the operator with the brake pedal, the pressure in the brake system will slightly increase, thereby extending the bellows 54 and completing a circuit through contacts 48a and 56 to signal light 38, to thereby give an indication that the driver has engaged the brake pedal. When the driver pushes further on the brake pedal, the pressure in the brake system and thereby the brake system output increases even further, thereby moving piston 62 to the right and causing the completion of a circuit through the contacts 48b and 62b, and through the signal light 36. Thus, the signal lights behind lenses 16 and 18 are energized, indicating a normal deceleration of the vehicle 10. Should the driver step heavily on the brake pedal, the pressure in the brake system will rise even more, causing piston 66 to move against the stronger spring 68, and thereby completing a circuit through contacts 66b and 48c, and through signal light 34 which is behind the lens 14. In this mode, all three of the red lenses 14, 16 and 18 will be illuminated by their respective signal lights 34, 36 and 38 in order to indicate a very rapid deceleration.

There has been provided a signal system which gives a readily visible and readily understood indication of the change in speed, either acceleration or deceleration, of an automotive vehicle. Because signal lights are numerically cumulatively energized, there is automatically imparted the necessary understanding of the information which is being signaled. The signal system of the present invention is so placed that it is in the usual line of sight of the driver of a following vehicle, thereby minimizing risk of rear end collision due to the inability of the driver of the following vehicle to see the signal lights.

What is claimed is:

1. A signal system for an automotive vehicle having a brake system comprising a plurality of signal lights, a plurality of switches each in circuit with one of said signal lights, and switch actuating means compirsing a first piston biased by a first spring and a second piston biased by a second spring of lesser strength than said first spring, whereby each of said switches is actuated at a different brake fluid pressure thereby cumulatively energizing a number of said signal lights in proportion to the actuation of the vehicle brake system.

2. The signal system of claim 1, there being at least two said signal lights, and said signal system further including at least two additional signal lights, and means for energizing said last mentioned signal lights cumulatively in response to vehicle engine manifold pressure.

3. The signal system of claim 2, there being three said signal lights energized from the vehicle brake system and three signal lights energized in response to vehicle engine manifold pressure.

4. A signal system for an automotive vehicle having an engine with an intake manifold, means for sensing the manifold pressure, a plurality of signal lights on said vehicle, and means for cumulatively energizing a number of said signal lights in proportion to manifold pressure.

5. The signal system of claim 4, said energizing means further comprising a plurality of switches each in circuit with a said signal light, and means for cumulatively actuating a number of said switches at different engine intake manifold pressures.

6. The signal system of claim 5, said last mentioned means comprising piston means fluid connected with the engine intake manifold.

7. The signal system of claim 4, there being at least two said signal lights.

8. The signal system of claim 7, there being three such signal lights.

References Cited

UNITED STATES PATENTS

| | | | |
|---|---|---|---|
| 2,134,299 | 10/1938 | Cosmer | 340—136 |
| 2,566,545 | 9/1951 | Alcoriza | 340—66 X |
| 2,784,348 | 3/1957 | Danek | 340—66 X |
| Re 23,719 | 10/1953 | Coombs | 340—66 |
| 2,946,042 | 7/1960 | Beasley | 340—69 |
| 3,320,586 | 5/1967 | Wagner | 340—66 |

THOMAS B. HABECKER, Primary Examiner

C. M. MARMELSTEIN, Assistant Examiner

U.S. Cl. X.R.

340—69, 94, 136